Aug. 14, 1928.  
J. W. DAWSON  
LOADING DEVICE  
Filed Sept. 11, 1926  
1,680,325  
2 Sheets-Sheet 2
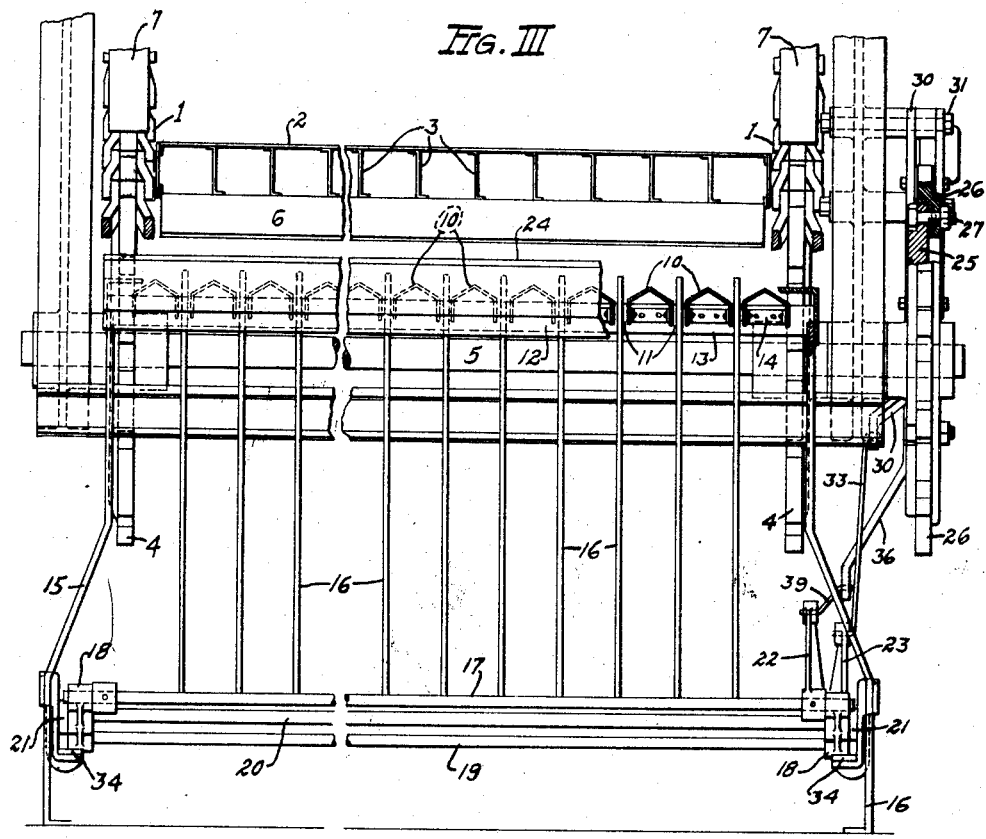
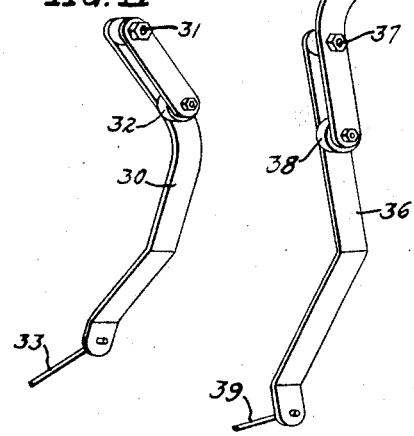
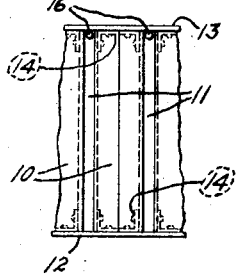
INVENTOR  
J. W. DAWSON  
By Cook & McCauley  
ATTORNEYS Patented Aug. 14, 1928.

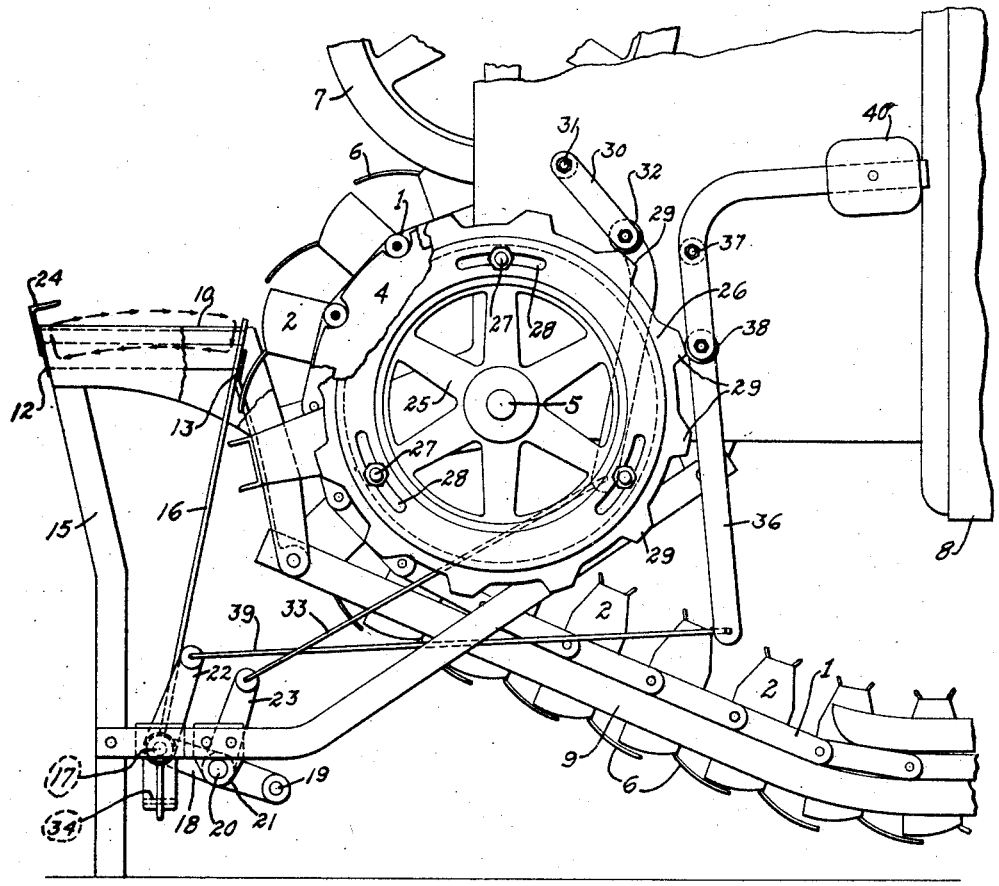

1,680,325

UNITED STATES PATENT OFFICE.

JOSEPH W. DAWSON, OF ST. LOUIS, MISSOURI, ASSIGNOR TO BARRY-WEHMILLER MACHINERY COMPANY, OF ST. LOUIS, MISSOURI, A CORPORATION OF MISSOURI.

LOADING DEVICE.

Application filed September 11, 1926. Serial No. 134,831.

This invention relates to loading devices, and to illustrate one form of the invention I will hereafter describe a feeding device adapted to deliver bottles, or other articles, to a conveyor.

Prior to this invention, rigid pushing devices have been used to push bottles into conveyors, and these devices have been moved back and forth in the same course. One objection to a rigid, or non-yielding, pushing device lies in the danger of breakage which is liable to occur under unusual conditions when a bottle strikes an obstruction, such as a rigid part of the conveyor, and in some instances the bottle entering the conveyor will be forced onto another bottle which failed to drop out of the conveyor at the discharge point.

An objection to moving the bottle-pushers back and forth in the same course lies in the loss of time involved in arranging the bottles in front of the pushing devices.

One of the objects of the present invention is to produce a simple yieldable feeding device whereby the bottles, or other articles, are delivered without danger of breakage when a bottle strikes a rigid obstruction.

Another object is to produce a feeding device movable in the course of the articles to feed them into a conveyor, or other apparatus, and adapted to return in a path entirely beyond said course. By moving the feeding device into and out of the course of the articles in the manner to be hereafter described, the articles to be loaded can be promptly positioned without waiting for the completion of the return stroke of the feeding device. The bottles, or other articles, are preferably arranged by hand in guides adjacent to the bottle conveyor, and the feeding device preferably comprises yielding pushers movable in one direction to feed the bottles from the guides to the conveyor, the pushers being then shifted to lie beyond the course of the bottles while returning to their starting positions.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of a portion of a bottle-cleaning machine equipped with a bottle conveyor and a loading device embodying the features of this invention, some of the parts being broken away.

Fig. II is a detail view showing one of the yieldable pushing rods and portions of its operating means.

Fig. III is a front elevation of the apparatus shown in Fig. I, with some of the parts shown in section, the lower portion of the bottle conveyor being omitted.

Figs. IV and V are perspective views of the cam levers.

Fig. VI is a fragmentary plan view showing portions of the channel guides for receiving the articles to be loaded.

The bottle conveyor comprises sprocket chains 1 carrying elongated bottle holders 2 provided with partitions 3 (Fig. III) forming a series of bottle compartments. Sprocket wheels 4 are driven by the chains and these wheels are fixed to a shaft 5 whereby the loading device is driven, as will be hereafter described. Each bottle holder 2 may be provided with an extension 6 adapted to form a closure for the next adjacent bottle holder, as shown at the lower portion of Fig. I. When the bottle holders travel around the sprocket wheels 4, their outer ends are widely separated from each other to open the closures 6. At each side of the machine (Fig. I) a guide wheel 7 lies above one of the sprocket wheels 4 to direct the chains over the sprocket wheels.

In Fig. I a portion of the tank of a bottle-cleaning apparatus is shown at 8, and the bottle holders may be guided in any suitable manner to enter this tank. As shown at the lower portion of Fig. I, a stationary track 9 lies below the chain 1 to aid in supporting the bottle holders.

The means for supporting the bottles immediately before they enter the bottle holders comprises a series of inverted channels 10 (Figs. I, III and VI) separated from each other to provide spaces 11 between them. The top faces of these channels are inclined as shown in Fig. III to form guides in which the bottles to be loaded may be arranged by hand, these guides being open at the top to receive the bottles, and they are approximately horizontal as shown in Fig. I to prevent accidental displacement of the bottles. The channels 10 forming these guides are located between a front bar 12 and a rear bar 13 to which they are connected by means of U-shaped members 14, as shown in Figs. III and VI. This guiding device may be supported by a frame including legs 15 and other minor structural details which form no part of the invention.

The means for feeding the bottles from the guiding device to the bottle holders 2 comprises a series of elongated pushing fingers 16, preferably elastic rods made of spring metal, having their free upper ends in the slots 11 and their lower ends secured to an oscillatory shaft 17, the latter being carried by the forward ends of arms 18. The rear ends of said arms are connected together by a rod 19 parallel with the shaft 17, and said arms are supported by means of a shaft 20 mounted in bearings 21.

The shaft 17, which carries the yielding fingers 16, is provided with an operating arm 22 whereby it is oscillated in the supporting arms 18 to push the bottles from the guides to the bottle holders. However, the supporting arms 18 are to be oscillated about the axis of shaft 20 for the purpose of raising and lowering the shaft 17 and its pushing fingers 16. An operating arm 23 is therefore secured to the shaft 20.

Before describing the details of the mechanism for driving the arms 22 and 23, I will refer to the movements of the yielding pushers 16 as illustrated in Figs. I and II. The arrows in Fig. I illustrate the course of the upper ends of these pushers. They occupy an elevated position while feeding the bottles into the bottle holders 2, and they return in a lower position entirely below the course of the bottles, so that another row of bottles may be placed on the guides 10 during the return stroke of these pushing fingers. After the fingers reach their delivery positions, shown by full lines in Fig. I, the arm 23 is operated to lower the shaft 17 and its fingers 16 to the positions shown by full lines in Fig. II. The operating arm 22 is then moved to the left to locate the fingers 16 in their starting positions, and upon the completion of this motion the other operating arm 23 is moved to the position shown by dotted lines in Fig. II, so as to elevate the fingers 16. The next operation consists in moving the arm 22 to shift the elevated fingers to the positions shown by Fig. I.

24 designates a shield in the form of an angle bar extending over one end of the course of the fingers 16 so as to lie immediately above said fingers when they occupy their starting positions. The fingers are elevated below this shield 24 so they cannot strike the bottles while rising to the horizontal plane in which the bottles are supported on the guides 10. This shield 24 lies adjacent to and transversely of the guides, and it prevents the operator from placing the bottles over the points at which the fingers 16 rise to the plane of the bottles.

The means for driving the operating arms 22 and 23 comprises a wheel 25 secured to the shaft 5 and a cam ring 26 adjustably secured to said wheel by means of bolts 27 which pass through slots 28 in the cam ring. Obviously, the cam ring can be adjusted circumferentially of the wheel 25, the slots 28 being concentric with the axis of said wheel, and since the wheel is driven by the bottle conveyor, the cam projections 29 will be accurately positioned with respect to the bottle holders, the object being to load each bottle holder when it lies adjacent to the guides 10. A lever 30 (Figs. I and IV) is pivoted at 31 and provided with a roll 32 engaging the periphery of the cam ring 26. A rod 33 connects the lower end of this lever 30 to the operating arm 23. The weight of this lever, together with the weight of the fingers 16, tends to retain the roll 32 in contact with the cam. However, it is not necessary for the roll 32 to contact with the bottoms of the notches between the cam projections 29, for the supporting arms 18 are stopped by engaging pads 34 when the fingers 16 are lowered.

A lever 36 (Figs. I and V) is pivoted at 37 and provided with a roll 38 engaging the periphery of the cam 26. A rod 39 connects the lever 36 to the operating arm 22 on the shaft 17 to which the fingers 16 are secured. The lever 36 is provided with a weight 40 tending to retain its roll 38 in contact with the cam 26.

The cam projections 29 may be exactly alike and they cooperate with the levers 30 and 36 to operate the arms 22 and 23, as hereinbefore described.

I claim:

1. In a loading device, guides for the articles to be loaded, a series of pushers extending into said guides to push the articles therein, a shield extending over the course of said pushers, said pushers being movable from a starting position below said shield to a delivery position remote from said shield, means for withdrawing said pushers from the course of the articles in said guides, and means for returning the pushers to said starting position while they are withdrawn.

2. In a loading device, guides for the articles to be loaded, and a series of pushers movable in said guides to push the articles therein, said pushers comprising a series of elongated elastic rods having free ends which yieldingly engage the articles.

3. In a loading device, guides for the articles to be loaded, a series of pushers movable in said guides to push the articles therein, said pushers comprising a series of elongated elastic rods having free ends which yieldingly engage the articles, and an oscillatory driving member secured to the other ends of said rods.

4. In a loading device, guides for the articles to be loaded, a series of pushers movable in said guides to push the articles therein, said pushers being yieldable independently of each other, driving elements whereby said yieldable pushers are moved along said guides and returned to their starting positions, and a shifter cooperating with said driving elements to cause return of said pushers while they are beyond the course of the articles in said guides.

5. In a loading device, guides for the articles to be loaded, an oscillatory driving member below said guides, a series of yieldable pushers secured to said oscillatory member and extending into said guides, a support in which said member oscillates, and a shifter whereby said support is raised and lowered to locate the pushers in the course of the articles during the feeding strokes and beyond said course during the return strokes.

6. In a loading device, guides for the articles to be loaded, a series of pushers movable in said guides to push the articles therein, said pushers comprising a series of elongated elastic rods having free ends which yieldingly engage the articles, an oscillatory shaft secured to the other ends of said rods, a support in which said shaft is mounted, and means whereby said support is raised and lowered to move said rods into and out of the course of the articles in said guides.

7. In a loading device, a receiving table provided with a series of approximately horizontal guides open at the top to receive the articles to be loaded, an oscillatory shaft below said guides, a series of pushers comprising elastic rods secured to said shaft and having free upper ends extending into said guides, an oscillatory support in which said shaft is mounted, an operating arm extending from said support, an operating arm extending from said shaft, and a cam device whereby said arms are driven intermittently.

8. In a device of the character described, a bottle conveyor adapted to receive rows of bottles, a series of guides whereby the bottles are directed to said conveyor, a series of pushers movable in said guides to push the bottles into the conveyor, means for withdrawing said pushers from the course of the bottles in said guides, and means for returning said pushers while they are withdrawn.

9. In a device of the character described, a bottle conveyor adapted to receive rows of bottles, a series of guides whereby the bottles are directed to said conveyor, a series of pushers movable in said guides to push the bottles into the conveyor, means for withdrawing said pushers from the course of the bottles in said guides, and means for returning said pushers while they are withdrawn, said pushers being yieldable independently of each other.

10. In a device of the character described, a bottle conveyor adapted to receive rows of bottles, a series of guides whereby the bottles are directed to said conveyor, a series of pushers movable in said guides to push the bottles into the conveyor, an operating member adapted to withdraw said pushers from the course of the bottles in said guides, an operating member adapted to return said pushers while they are so withdrawn, and driving means including a cam common to both of said operating members.

11. In a device of the character described, a bottle conveyor adapted to receive rows of bottles, a series of guides whereby the bottles are directed to said conveyor, a series of pushers movable in said guides to push the bottles into the conveyor, an operating member adapted to withdraw said pushers from the course of the bottles in said guides, an operating member adapted to return said pushers while they are so withdrawn, and driving means including a cam common to both of said operating members, said cam comprising a wheel and a cam ring adjustably secured to said wheel.

12. In a device of the character described, a bottle conveyor adapted to receive rows of bottles, a series of guides whereby the bottles are directed to said conveyor, a series of pushers movable in said guides to push the bottles into the conveyor, an operating member adapted to withdraw said pushers from the course of the bottles in said guides, an operating member adapted to return said pushers while they are so withdrawn, and driving means including a cam common to both of said operating members, said cam being driven by said conveyor and provided with a series of projections through which motion is transmitted to said operating members.

In testimony that I claim the foregoing I hereunto affix my signature.

JOSEPH W. DAWSON.